(12) United States Patent
Wilson

(10) Patent No.: US 6,662,537 B1
(45) Date of Patent: Dec. 16, 2003

(54) STABLE ATHLETIC EQUINE BOOT

(75) Inventor: Robby Wayne Wilson, Stephenville, TX (US)

(73) Assignee: Equibrand Corporation, Granbury, TX (US)

( * ) Notice: Subject to any disclaimer, the term of this patent is extended or adjusted under 35 U.S.C. 154(b) by 0 days.

(21) Appl. No.: 10/225,100

(22) Filed: Aug. 21, 2002

(51) Int. Cl.7 .............................. B68C 5/00; A01L 3/00
(52) U.S. Cl. ............................................. 54/82; 168/18
(58) Field of Search .......................... 54/82; 168/1, 3, 168/18

(56) References Cited

U.S. PATENT DOCUMENTS

| | | | | |
|---|---|---|---|---|
| 162,052 A | * | 4/1875 | Gilbert ........................ 168/25 |
| 167,895 A | * | 9/1875 | Hall ............................. 168/2 |
| 280,107 A | * | 6/1883 | Wild ............................ 168/2 |
| 342,790 A | * | 6/1886 | Fenton ........................ 54/82 |
| 524,555 A | * | 8/1894 | Morgan ....................... 54/82 |
| 533,468 A | * | 2/1895 | Ioset ........................... 168/2 |
| 3,703,209 A | | 11/1972 | Glass .......................... 168/18 |
| 3,732,929 A | | 5/1973 | Glass .......................... 168/18 |
| 3,800,504 A | | 4/1974 | Gregory ...................... 54/82 |
| 4,290,487 A | | 9/1981 | Unger ......................... 168/18 |
| 4,470,411 A | | 9/1984 | Hoyt, Jr. ..................... 128/165 |
| 4,548,026 A | | 10/1985 | Shidner ...................... 54/82 |
| RE32,930 E | | 5/1989 | Westropp .................... 54/82 |
| 5,115,627 A | | 5/1992 | Scott ........................... 54/82 |
| 5,148,872 A | | 9/1992 | Dallmer ...................... 168/11 |
| 5,224,549 A | | 7/1993 | Lightner ..................... 168/18 |
| 5,363,632 A | | 11/1994 | Armato ....................... 54/82 |
| 5,588,288 A | | 12/1996 | Origgi et al. ................ 54/82 |
| 5,715,661 A | | 2/1998 | Meyers ....................... 54/82 |
| 5,871,458 A | | 2/1999 | Detty .......................... 602/27 |
| 5,910,126 A | | 6/1999 | Wilson et al. ............... 602/75 |

* cited by examiner

Primary Examiner—Robert P Swiatek
(74) Attorney, Agent, or Firm—John H. Miller

(57) ABSTRACT

A horse boot that resists turning on the horse's hoof when the horse is jumping, running and turning in water, mud, sand and sawdust comprises a bell portion having an internal protrusion, a cuff extending above the top of the bell portion sufficient to reach or almost reach the fetlock of the horse and a fastener for securing the boot onto the horses hoof is disclosed. Also disclosed is a method of making the boot.

20 Claims, 3 Drawing Sheets

STABLE ATHLETIC EQUINE BOOT

The present invention involves an equine boot for protecting the back of the front legs, fetlocks, pastern bones and hoofs of horses during vigorous activity, particularly in water, sand and mud and a method of making the boot.

BACKGROUND

Boots to prevent injury to the back of horses front fetlocks, pastern bones and hoofs when running and doing hard maneuvers, such as in various competitions like jumping, barrel racing, roping, cutting, etc. are known, and it is also known to form a protrusion on the inside of the boot that fits into the depression in the back of each front hoof to hold the boot in place and to prevent turning. It is known to make equine boots by sandwiching a foam layer between exposed layers of cloth as shown in U.S. Pat. No. 4,548,026. It is also known to make the boots using a series of vertical panels as is disclosed in U.S. Pat. No. Re 32,930. It is also known to use different types of fasteners such as that shown in these and other patents, including Velcro® straps, leather straps with various kinds of buckles, laces and cleats, etc. Boots like the one described in this last named patent did not function satisfactorily as explained in column 1 of U.S. Pat. No. 4,548,026 previously cited above.

The rear of the boot is often made of a tough, cushiony material, which, under good conditions, protects the vulnerable rear area behind the horse's front hooves. However, although there are many different kinds of boots to protect horse's front hoofs, all suffer a characteristic that still allows injury in certain conditions. Those conditions are water, sand, sawdust and mud. When the horse is running in or jumping into several inches of water, mud, sawdust or sand, the water, mud, sawdust or sand pushes the boot upward exposing the vulnerable area behind the front hoof, allowing the boot to turn and allowing the front of the rear hoof to strike the vulnerable area injuring the rear portion of the horse's coronet and/or pastern and/or the bulb of the heel of the hoof. A boot that would not turn even in mud, water or sand is very desirable.

SUMMARY OF THE INVENTION

The invention comprises an equine no-turn boot comprising a bell portion for covering a major portion of a hoof, a cuff integral with or attached to the bell adjacent the top of the bell portion, and a fastener for securing the no-turn boot to the hoof, the bell portion having a scuff portion or pad on the back side of the bell portion and the cuff portion being about 1.3 to about 1.75 inches in height. The cuff preferably extends about 1.5+/−⅜ inch above the top of the bell portion, more preferably about 1.5+/−¼ inch and most preferably about 1.5+/−⅛ inch above the top of the bell portion.

The fastener preferably is on the side of bell portion near the front, but can be in other locations such as on the front of the bell portion. The fastener is preferably a Velcro® type fastener, but other types of fasteners can be used such as a strap having holes and a buckle, a strap and a no-slip slotted buckle, laces and eyes or cleats etc. The bell portion can be of a round shape, but preferably is relatively flat or generally straight across the back in the scuff pad portion. The fastener is preferably located to be on the outside of the horses hoof and near the front making it easier to fasten, being out of the way of the other front hoof and more effectively securing the boot on the horse's hoof and lower leg. The no-turn boot also preferably comprises a raised portion on the inside of the bell portion adjacent the upper edge of the bell portion and opposite the scuff portion or pad designed to fit between the two bulbs of the heel of the hoof.

The invention also comprises a method of making the above no-turn boot comprising attaching an outer covering material to an inner covering material with a layer of foam material with a shape that forms a bell portion of the boot, attaching a scuff pad to the exterior of a backside of the boot and attaching fastening means to the bell portion of the boot, the bell portion having a shape that fits around the outside of a horse's front hoof, the improvement comprising attaching a cuff that is flexible to the top of the bell portion of the boot, the cuff extending a distance in the range of about 1.25 to about 1.87 inches above the top of the bell portion, the cuff, being semi-rigid and sized to fit snugly around the pastern of the horse.

When the words equine and horse are used they are meant to include all animals resembling a horse and having hooves similar in shape as a horse even though smaller. Thus, such words would include horses of all types, mules, ponies of all types, zebras, etc.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
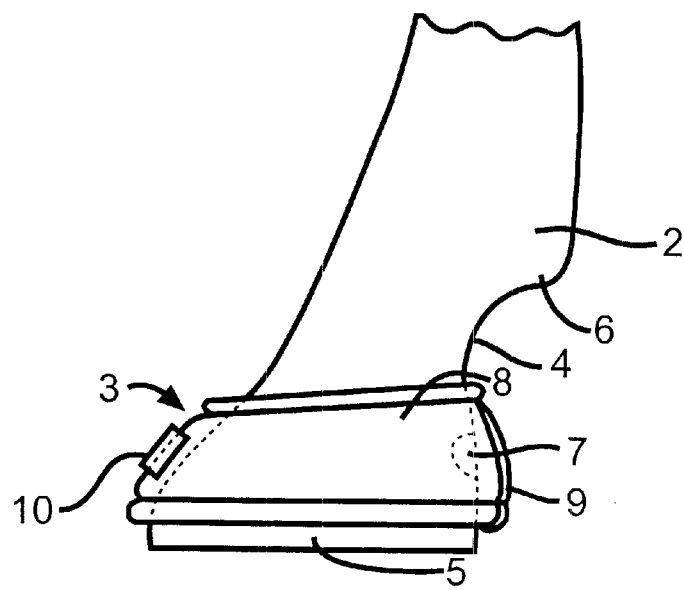
FIG. 1 shows the lower portion of a horse's left leg and hoof with a prior art boot covering most of the hoof and the coronet.

FIG. 1 shows the lower portion of a horse's front leg 2 with a prior art boot 3 shown covering much of the horse's hoof 5. When a horse is engaged in vigorous jumping, running, turning, stopping and accelerating the horse frequently over reaches with a hind leg causing the front of a rear hoof to strike the rear of a front hoof and/or leg causing injury which can temporarily, or sometimes permanently, incapacitate or handicap the horse for vigorous activity. Boots such as the boot 3 for covering the front hoofs 2 are known and used to try to prevent such injuries, however known boots often are pushed up and sometimes turned when the horse is operating in sand, mud or water, exposing the vulnerable parts of the horse's front hoofs 5 and legs 2 to injury. The parts of the horse's front legs 2 vulnerable to incapacitating injury are the pastern 4, the bulb of the heel of the hoof (back of the hoof), the short bony part of the foot above the hoof and below the fetlock 6, and the coronet 8, the lowest part of the pastern 4, particularly the rear part of the coronet which contains ligaments, tendons, arteries, veins, and nerve endings as partially shown in FIG. 1 of U.S. Pat. No. 3,703,209.

The prior art boot 3 shown in FIG. 1 is constructed of a foam core, covered on the inside with a soft fabric and on the outside with a nylon fabric. A raised generally triangular protrusion 7 exists in the center portion of the top inside of the boot 3 at the back of the hoof 5. A scuff pad 9 is attached on the exterior of that portion of the boot 3 covering the back of the hoof 5. The prior art boot 3 is separated generally in the center of the front of the hoof 5 and is continuous around the rest of the hoof 5. The boot 3 is secured in place with a Velcro® fastener 10. This boot 3 works well in good conditions, but can be pushed upward when the horse is maneuvering vigorously in mud, water and/or sand exposing the vulnerable rear portion of the leg 2 and hoof 5.

Figure 2:
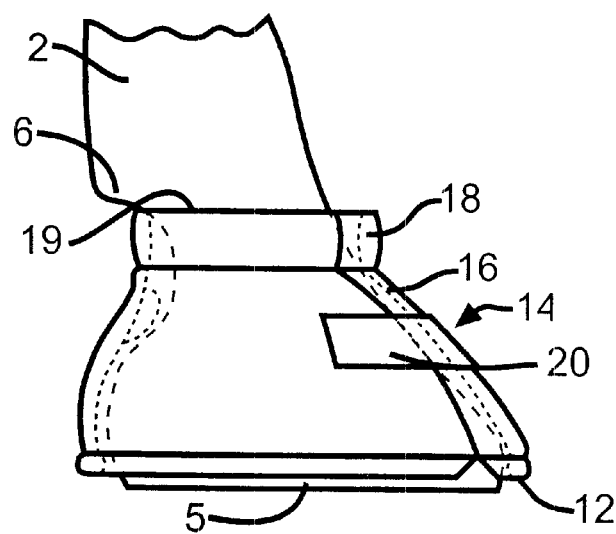
FIG. 2 shows the lower portion of a horse's right leg and hoof having a preferred embodiment boot of the present invention covering the hoof, coronet and most or the entire pastern.

FIG. 2 shows in a preferred embodiment of a boot 14 of the present invention on a horse's front leg 2 and around the hoof 5 and the pastern 4. The boot 14 includes a bell portion 16 for covering most of the hoof 5, a cuff 18 for covering the pastern 4 up to or almost up to the fetlock 6 and a closure or fastener 20. A bottom edge 12 of the bell portion 16 preferably is above the bottom of the hoof 5 when the boot 14 is in place on the horse, but can extend to the bottom edge of the hoof 5 if desired. When the boot of the present invention is fastened in place on the horse's hoof 5 and lower portion of the leg 2 of the horse, the cuff 18, being semi-rigid yet flexible, fits snugly around the pastern 4, i.e. tends to hug the pastern, and a top 19 of the cuff 18 comes up to the fetlock 6, or so near the fetlock 6, as to prevent the boot of the present invention from moving upward on the horse's leg 2 or the hoof 5 due to forces exerted by mud, sand, or water. The cuff 18 preferably extends about 1.5+/−⅜ inch above the top of the bell portion 16 of the preferred boot 14, more preferably about 1.5+/−¼ inch and most preferably about 1.5+/−⅛ inch above the top of the bell portion 16.

Figure 3:
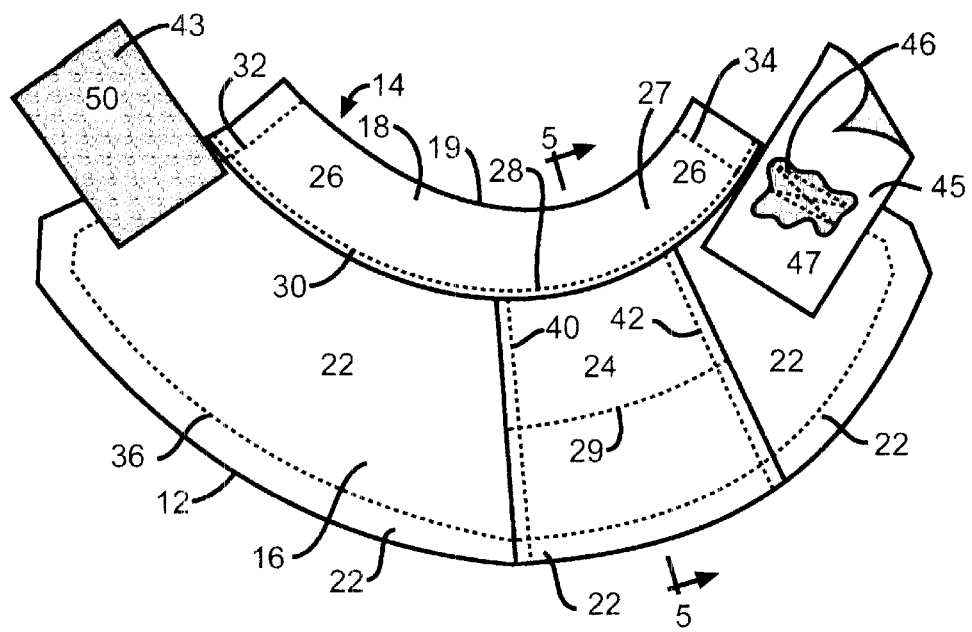
FIG. 3 is a top view of the preferred boot shown in FIG. 2 when it is off the horse and laid out flat.
Figure 4:
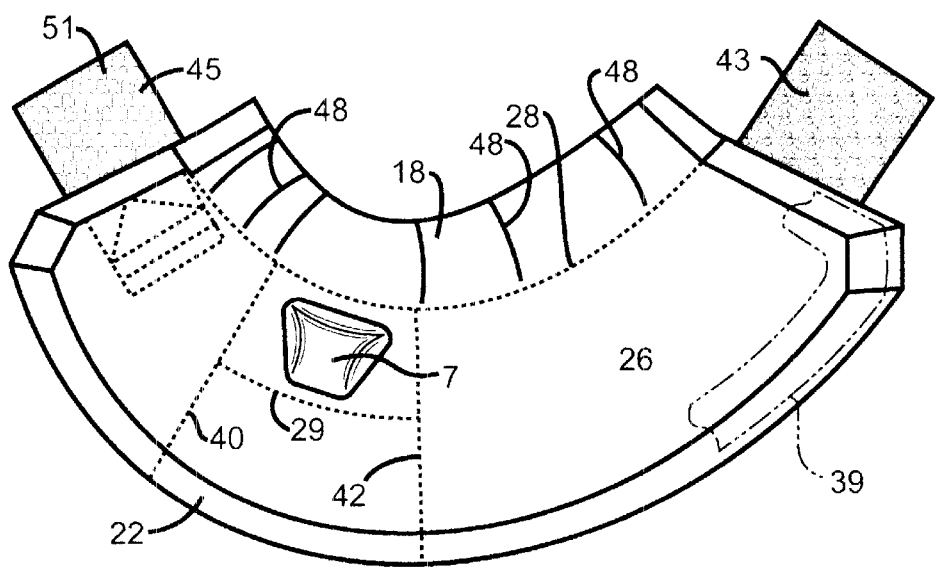
FIG. 4 is a bottom view of the preferred boot shown in FIG. 3.
Figure 5:
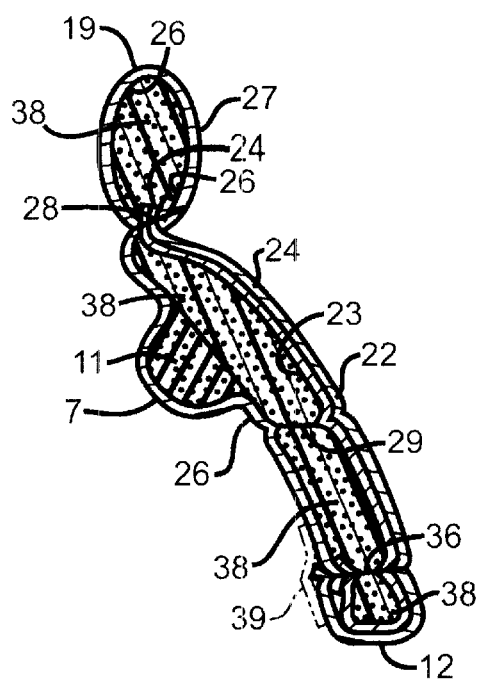
FIG. 5 is a cross section of the back part of the preferred boot shown in FIGS. 2–4 taken along lines 5—5 in FIG. 3.

FIGS. 2–4 show other novel features of the boots of the present invention. FIG. 3 shows the exterior of the preferred boot 14. The outer covering 22 of the of the bell portion 16 is preferably a woven fabric like 2520 denier Oxford Nylon having two coats 23 of polyurethane on one face, the hidden face (see FIG. 5), but many different materials can be used. The purpose of the polyurethane coating 23 on the back of the Oxford Nylon outer covering 22 is to provide a water barrier and to provide some stiffness to the material. The outer covering 22 wraps under the bottom edge 12 of the boot 14 and up about ½ inch on the inside of the boot 14 as shown in FIG. 4. The outer material should be flexible, strong and preferably water resistant. Other suitable materials for the outer covering 22 would include any material now used for the covering of horse boots such as leather, woven synthetics including 18 oz. woven polyester, polyethylene, polypropylene, polyurethane, tarp canvas, leather, rubber, etc.

A scuff pad 24 is attached by any known means, such as by sewing, to the back of the boot 14. The purpose of the scuff pad 24 is to resist damage to the boot 14 and the bulb of the hoof 5 by the front edges of the horses rear hooves. Any flexible tough fabric or layer can be used for the scuff pad 24 such as Kevlar®, leather, rubber, heavy nylon, Vibram®, etc. The preferred material for the scuff pad 24 is Keprotec®, having a basis weight of about 480 to 680 grams per square meter preferably about 575 gms/sq. m. with a DIN 53863 of about 16,000 (other weights also suitable), available from Schoeller Textil USA, Inc. of Seattle, Wash. Keprotec® has a composition of about 6% EL, about 28% KE, about 36% PA, about 28% PU and about 5% quartz. The scuff pad 24 begins close to the bottom of the skirt 18 extending to the bottom of the bell 16 and wraps under the bottom edge 12 of the bell 16 and extends up the inside of the bell 116 a short distance, such as about ½ inch. The scuff pad 24 could be attached in any known manner such as with stitches, adhesive, rivets, etc. Preferably the scuff pad 24 is attached with stitches as will be described later.

The interior of the boot 14 is covered with a fabric, preferably a soft fabric and most preferably a covering 26 of knitted Jersey nylon of about 80 denier and knitted to have a 4-way stretch. The covering 26 not only covers most of the interior of the bell portion 16, but also covers the interior of the cuff 18 and wraps over the top 19 of the cuff 18 and also covers the outside surface 27 of the cuff 18 ending at a top stitch 28 running most of the way along the lower portion 30 of the skirt portion 18 from at least one side stitch 32 to at least a second side stitch 34. The top stitch 28 also secures a top portion of the outer covering 22 and a top portion of the scuff pad 24 together with the interior covering 26. In addition to the top stitch 28, the scuff pad 24 is also secured to the outer covering 22 and the interior covering 26 with a first intermediate vertical stitch 40, a second intermediate vertical stitch 42, each of these two stitches 40 and 42 running near to and parallel to the side edges of the scuff pad 24, and a middle back stitch 29. All stitches used in the boot 14 can be of various sizes and types normally used, but a straight stitch is preferred with about 6stitches per inch being the most preferred with a 138 polyester thread. The covering 26 is secured the exterior covering 22 of the bell portion 16 on the interior of the bell portion 16 near the bottom edge 12 of the bell portion 16 with a lower stitch 36 that runs from at least the first side stitch 32 to at least the second side stitch 34. The loose edge of the exterior covering 22 past the lower stitch 36 can be covered with any conventional fabric tape 39 (see FIGS. 4 and 5) if desired to improve the appearance and to make the interior smoother.

Sandwiched between the outer covering 22 and the covering 26 for the interior in both the bell portion 16 and the skirt portion 18 is a layer of foam material 38, preferably about a ¼ inch thick layer of EPT polyethylene butyl foam having a compression deflection of about 4–7 and a density of about 5–8pounds per cubic foot. Other kinds of foam will work and should be a foam that does not get hard or change compressibility materially when the ambient temperature falls below zero. A protrusion 7 is formed in the interior of the bell portion 16 on the back inside of the boot 14 by placing an appropriately shaped piece of foam rubber 11 known for this purpose next to the foam layer 38 in the appropriate place prior to applying the interior covering 26 in the known manner. The protrusion 7 has a shape and is located to fit into the bulb of the hoof when the boot 14 is secured in place on the horse to aid in preventing the boot from turning on the horse's leg and hoof. The combination of the foam layer 38 and the stretchable interior covering 26 permits the horse to freely move the pastern and hoof freely without hindrance from the no-turn boot 14. If the interior covering 26 is not held taught during sewing the various stitches to fabricate the boot 14, several pleats 48 will form on the inside of the cuff 18 during fabrication since the inside circumference of the cuff is shorter than the outside circumference of the cuff 18. These pleats 48, although not desired and can be avoided by holding the interior fabric taught during sewing, nevertheless are slight and soft and do not significantly affect the fit or the comfort of the boot 14.

The preferred boot 14 is constructed so that an opening or joint 41 between the two ends of the boot 14, when the boot 14 is secured on the horse, is located on the outside of the hoof, close to the front of the hoof as shown in FIG. 2. The boots of the present invention could be constructed so that the joint 41 would be in other locations, such as at the front of the hoof, but these embodiments are less desirable. The preferred location of the joint 41, as shown in FIG. 2 makes it easy to install the boots 14, provides for better protection of the horse's front lower legs and improves the effectiveness of the fastener.

The fastener 20 can be of any known type that is flexible, such as Velcro® fasteners of known designs, buckles of various types used to secure boots and shoes, cleats and laces, belt and buckles of most types including, snaps, hooks and eyes etc., and is preferably attached only to the bell portion 16 of the boot 14, allowing the cuff 18 to move and stretch freely on the horse's pastern area of the leg. In the preferred boot 14 the fastener 20 is preferably a Velcro® type fastener. The preferred Velcro® type fastener 20 is of the same type as shown on the prior art boot 3, but the placement on the boot 14 is preferably in a novel position, on the outside of the hoof 5 close to the front of the hoof 5 so that a part of the fastener 20 extends around to a portion of the front of the hoof 5 for the reasons stated above. This preferred location of the fastener and gap in the bell portion 16 and cuff 18 of the boot is important to providing maximum protection to the front of the hoof. The fastener comprises a first flap 43 that is preferably covered with Velcro® hooks 50 on both front and back surfaces. The first flap 43 is sewn onto the outside of the boot 14 near one end of the boot 14 so that about 1–2 inches of the first flap 43 extends beyond the end of the boot 14 when the boot 14 is open, see, FIG. 3. The first flap 43 is sewn to the bell portion of the boot 14 over a length preferably of at least ½–¾ of an inch using several stitches as shown.

The preferred fastener further comprises a second, and longer, flap 45 preferably having Velcro® loops 51 covering all or most of one face, the face that is hidden when the boot 14 is secured on the horse. The face having the Velcro® loops has an attached portion 46 and an unattached portion 47 (See FIG. 3). The length of the attached portion 46 should be the same or almost the same as the length of the unattached portion of the first flap 43 because one face of the first flap 43 attaches to the attached portion 46 of the second flap 45. This also allows the boot to fit slightly different sized hooves. The boots 14 can be made in various sizes to fit different sized hooves, but some adjustment in size can also be made with the fastener. The attached portion 46 of the second flap 45 is preferably sewn to the exterior of the bell portion 16 of the boot 14 to align with the first flap 43 when the boot is in a closed position. Several stitches are used to attach the attached portion 46 of the second flap 45 as shown in FIGS. 3 and 4.

Figure 6:
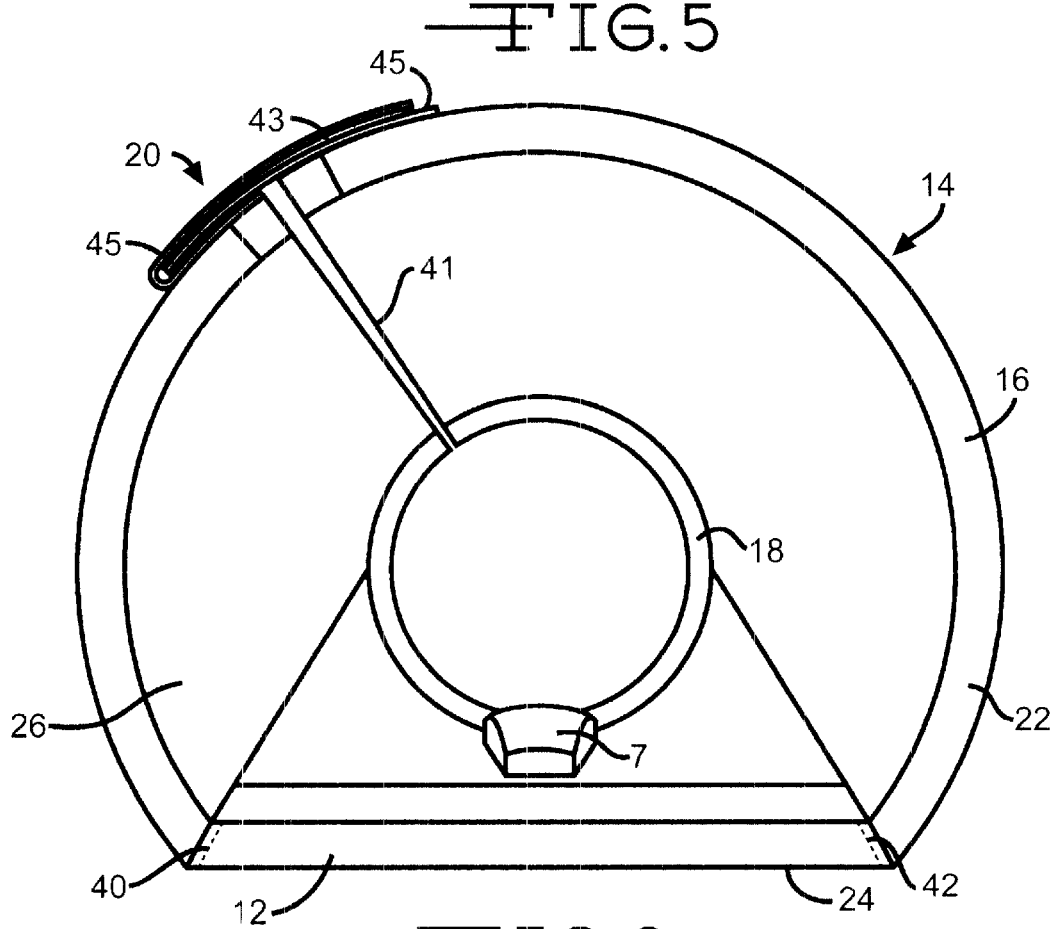
FIG. 6 is a bottom view of the preferred boot of the present invention when the boot is fastened onto the horse's hoof and leg.

The boots of the present invention are preferably constructed such that the scuff pad 24 is generally straight across the back of the boot 14 as is shown in FIG. 6 by the bottom edge 12 of the bell portion 16 in the region where the scuff pad 24 is attached, i.e. the back of the boot 14. The back of the bell portion 16 of the boot 14 where the scuff pad 24 is attached has a vertical profile like that shown in FIG. 5 when the boot 14 is secured on a horse.

The boots of the present invention can be made in many sizes, but typically are made in several sizes including small, medium, large and extra large. The fabrics and materials used to make the boots can be in any of many colors, but preferably all surfaces showing are black, charcoal, or dark gray. The color is a matter of choice.

Only the preferred embodiments of the present invention have been described in detail above. It will be obvious to the ordinary artisan, having the benefit of the above disclosure, that many other embodiments within the broad description of the invention are possible. Such embodiments are intended to be included within the scope of one or more of the following claims.

I claim:

1. An equine boot for the protection of a front hoof and pastern of a horse comprising a bell portion having an outer cover, a soft, stretchable inner covering and a foam material layer sandwiched between the outer cover and the inner covering, a protrusion on the interior back part of the bell, a scuff pad attached to a backside of the bell back portion and a fastener, the improvement comprising a cuff integral with or attached to a top of the bell portion and extending a distance of from about 1.25 inches to about 1.87 inches above said top, a distance that places a top of said cuff against or almost against the bottom of the fetlock of the horse when the boot is fastened in place on the horses front hoof, the cuff preventing the boot from moving upward and turning on the front hoof of the horse sufficiently to allow the horse to injure at least one member on the front leg selected from the group consisting of the hoof, a coronet and the pastern.

2. The boot according to claim 1 wherein the cuff is flexible.

3. The boot according to claim 2 wherein the cuff is comprised of a covering of stretchable material with a foam layer sandwiched therein.

4. The boot according to claim 3 wherein the cuff extends above the top of the bell portion of the boot a distance in the range of about 1.5+/−⅛ inches.

5. The boot according to claim 3 wherein the boot has two ends that come together or almost come together when the boot is fastened on a horse's hoof and wherein the place on the hoof that the ends come together is adjacent the side of the hoof facing away from the other front hoof and at or near the front of the hoof.

6. The boot according to claim 2 wherein the cuff extends above the top of the bell portion of the boot a distance in the range of about 1.5+/−⅛ inches.

7. The boot according to claim 6 wherein the boot has two ends that come together or almost come together when the boot is fastened on a horses hoof and wherein the place on the hoof that the ends come together is adjacent the side of the hoof facing away from the other front hoof and at or near the front of the hoof.

8. The boot according to claim 2 wherein the boot has two ends that come together or almost come together when the boot is fastened on a horses hoof and wherein the place on the hoof that the ends come together is adjacent the side of the hoof facing away from the other front hoof and at or near the front of the hoof.

9. The boot according to claim 1 wherein the cuff extends above the top of the bell portion of the boot a distance in the range of about 1.5+/−⅛ inches.

10. The boot according to claim 1 wherein the boot has two ends that come together or almost come together when the boot is fastened on a horse's hoof and wherein the place on the hoof that the ends come together is adjacent the side of the hoof facing away from the other front hoof and at or near the front of the hoof.

11. The boot of claim 1 wherein a fabric tape is attached over the edge of the outer covering on the interior of the bell portion of the boot close to a lower stitch.

12. An equine boot for the protection of a front hoof and pastern of a horse comprising a bell portion having an outer cover, a soft, stretchable inner covering and a foam material layer sandwiched between the outer cover and the inner covering, a protrusion on the interior back part of the bell, a scuff pad attached to a backside of the bell back portion and a fastener, the improvement comprising a cuff integral with or attached to a top of the bell portion and extending a distance of from about 1.25 inches to about 1.87 inches above said top, a distance that places a top of said cuff against or almost against the bottom of the fetlock of the horse when the boot is fastened in place on the horses front hoof, the fastener, when the boot is in place on the horse's hoof, being entirely on the bell portion and being wrapped around the front and the outboard side of the hoof, the cuff preventing the boot from moving upward and turning on the front hoof of the horse sufficiently to allow the horse to injure at least one member on the front leg selected from the group consisting of the hoof, a coronet and the pastern.

13. The boot of claim 12 wherein the cuff extends from about 1.5+/−⅛ inch above the top of the bell portion.

14. The boot of claim 12 wherein a fabric tape is attached over the edge of the outer covering on the interior of the bell portion boot close to a lower stitch.

15. A method of making a boot for protecting front hooves of a horse comprising attaching an outer covering material to an inner covering material with a layer of foam material with a shape that forms a bell portion of the boot, attaching a scuff pad to the exterior of a backside of the boot and attaching fastening means to the bell portion of the boot, the bell portion having a shape that fits around the outside of a horse's front hoof, the improvement comprising attaching a cuff to the top of the bell portion of the boot, the cuff extending a distance in the range of about 1.25 to about 1.87 inches above the top of the bell portion, the cuff being semi-rigid and sized to fit snugly around the pastern of the horse.

16. The method of claim 15 wherein the cuff is also stretchable.

17. The method of claim 16 wherein the bell portion is constructed to have two ends that form a joint between the two ends when the boot is in place on the horse, the bell portion being constructed such that the joint, when the boot is secured onto the horse, is adjacent a side of the hoof facing away from the other front hoof and at or near the front of the hoof.

18. The method of claim 15 wherein a fabric tape is attached to the outer covering so as to cover an edge of the outer covering on the interior of the bell portion of the boot close to a lower stitch.

19. The method of claim 15 wherein the bell portion is constructed to have two ends that form a joint between the two ends when the boot is in place on the horse, the bell portion being constructed such that the joint, when the boot is secured onto the horse, is adjacent a side of the hoof facing away from the other front hoof and at or near the front of the hoof.

20. The method of claim 17 wherein a fabric tape is attached to the outer covering so as to cover an edge of the outer covering on the interior of the bell portion of the boot close to a lower stitch.

* * * * *